J. CARROLL.
GATE.
APPLICATION FILED NOV. 6, 1911.
1,061,448.
Patented May 13, 1913.
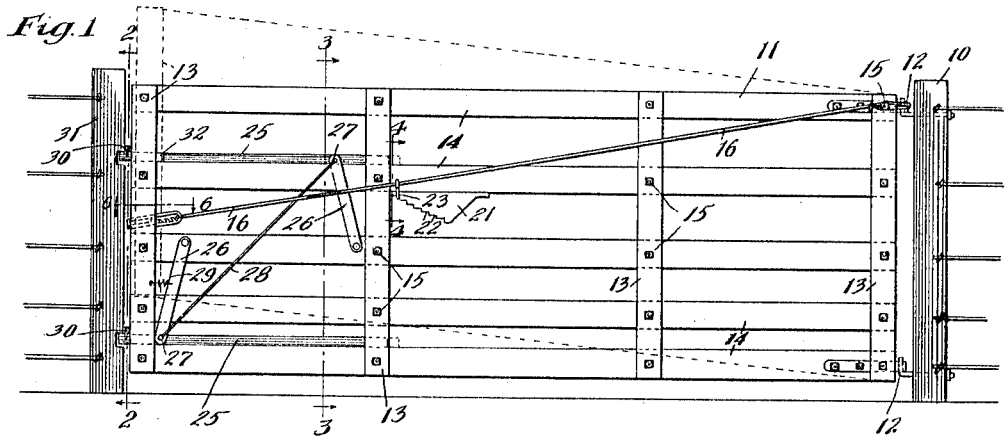
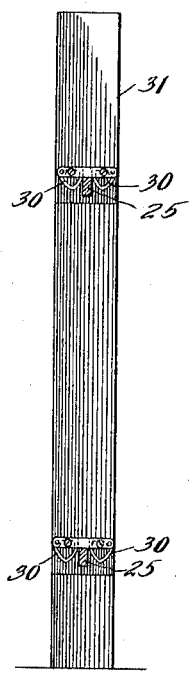
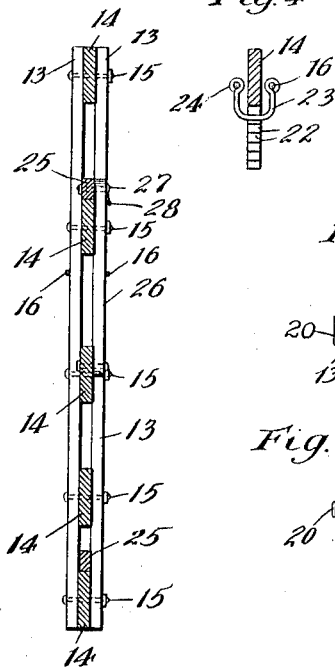
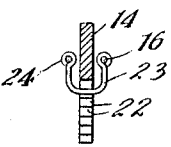
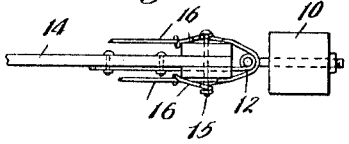
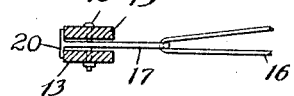
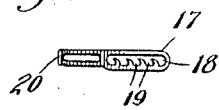
Witnesses:
Wm. Geiger
Pearl Abrams
Inventor:
James Carroll
By Mundy, Evarts, Adcock & Clarke,
his Attys.
COLUMBIA PLANOGRAPH CO., WASHINGTON, D. C.

UNITED STATES PATENT OFFICE.

JAMES CARROLL, OF PITTSFIELD, ILLINOIS.

GATE.

1,061,448.  Specification of Letters Patent. Patented May 13, 1913.

Application filed November 6, 1911. Serial No. 658,645.

*To all whom it may concern:*

Be it known that I, JAMES CARROLL, a citizen of the United States, residing in Pittsfield, in the county of Pike and State of Illinois, have invented a new and useful Improvement in Gates, of which the following is a specification.

This invention relates to improvements in gates, and more specifically to farm gates as used in connection with fences for retaining cattle in closures.

It is well known that gates sag after being in use for a short time, and that it often becomes difficult to swing the gate clear of the ground, and one of my objects is to provide mechanism which, when applied to a gate, will overcome this defect.

Another object of my invention is to provide a gate which may be adjustable so that its free end may be raised or lowered to any desired height in order to allow the gate to clear small obstructions or to allow small stock to readily pass thereunder while the gate is closed, but at the same time preventing larger cattle from passing through the gate.

Still another object of my invention is to provide a double latch which shall be particularly adapted to the type of gate which I have described above.

The means which I employ to accomplish the above results consists in a gate preferably composed of upright and horizontal members pivotally connected together, a brace member or flexible loop extending substantially diagonally across the gate and adjustably anchored at one end, means for deflecting the loop and maintaining the same in its deflected position, a double latch consisting of two slide pieces mounted to slide on two horizontal members of the gate, and pivotally mounted arms for operating the slide pieces connected preferably by a flexible member, whereby the movement of one slide piece or one of the pivotally mounted arms retracts both slide pieces or latches simultaneously.

My invention further consists in the improvements in parts and devices and in the novel combinations of parts and devices hereinafter shown and described or claimed.

In the drawing forming a part of this specification, Figure 1 shows an elevation of a gate embodying my improvements, showing also in dotted lines the position assumed by the gate when the brace member has been deflected or adjusted. Fig. 2 is an elevation, taken substantially on the line 2—2 of Fig. 1, looking in the direction of the arrows. Fig. 3 is a vertical section, taken on the line 3—3 of Fig. 1, looking in the direction of the arrows. Fig. 4 is a detail view, taken substantially on the line 4—4 of Fig. 1, and looking in the direction of the arrows. Fig. 5 is a detail plan view, showing the method of attaching the loop or brace member at one of its ends. Fig. 6 is a detail section of the anchoring means for one end of the loop, taken on the line 6—6 of Fig. 1, and looking in the direction of the arrows, and Fig. 7 is a detail view of the anchoring means.

In the drawing, 10 denotes the hinge post, which may be of any ordinary construction, having pivoted thereto a gate 11 by means of hinges 12. The gate, as I have shown it, preferably consists of uprights 13 and horizontal members or cross bars 14, the cross bars 14 extending between the spaced uprights 13 and pivotally connected thereto at all points, as by means of bolts and nuts 15. To take up the sag of the gate or to adjust the same, I provide a brace or loop member 16 preferably extending around opposite sides of the gate from the upper corner of the hinged end of the gate diagonally to a point approximately midway the ends of the uprights on the free end of the gate, and it will be understood that by the use of the word "diagonally", I mean from a point on one end of the gate to a point lower down on the other end of the gate, and not necessarily from one corner to the corner diagonally opposite. This brace or loop member 16 may be composed of any suitable flexible material and extends through an anchoring member 17 at the free end of the gate, and has ends terminating preferably around the upper hinge and twisted around the bolt passing through the uprights and the upper horizontal cross bar, the terminals of the loop being wound upon the main portion of the loop in order to prevent the same from becoming loose, all as more clearly shown in Fig. 5. The anchoring means or member 17 consists preferably of a metal casting, having a slotted portion 18 and notches 19 formed therein, and a T-shaped portion 20, said anchoring member 17 being slidable and freely movable between the uprights 13 at the free end of the gate when the loop is not taut.

It will be apparent that by placing the loop in the different notches of the anchoring member, the gate may be easily adjusted and the free end thereof raised or lowered, as desired. Mounted on one of the cross bars, and preferably on the one next to the top at a point intermediate the two center sets of uprights, is a triangular adjusting member 21, having a series of steps or notches 22, whereby the loop or brace member 16 may be deflected by means of a bail or U shaped piece 23, loosely and slidably mounted on the loop 16, as by means of eyes 24. By placing the bail 23 on the different notches on the member 21, the brace member 16 may be deflected as desired, thereby decreasing the distance between the ends of the brace and thus causing the distance between the diagonally opposite corners of the gate to be changed. I also provide my gate with a double latch comprised of two slide pieces 25, preferably mounted on two of the cross pieces 14, and between two sets of the uprights 13, see Fig. 3. Pivotally mounted preferably on the intermediate cross piece are two arms 26 extending in opposite directions from the cross bar, and each pivotally connected at 27 with one of the slide pieces 25. Extending between the pivots 27 is a connecting member 28, which is preferably flexible, whereby a movement of the top slide piece or the upper pivot arm 26 operates both latches or slides 25 simultaneously. The latches or slide pieces 25 are normally projected outwardly from the free end of the gate by means of a spring 29 attached to one of the arms 26 and to an upright 13, and I also prefer to provide a stop 32 on the upper slide member or latch 25 to limit the outward movement thereof. The latches 25 engage pivot members 30 on the latch post 31.

It will be obvious that many changes may be made in various details of my mechanism without departing from the spirit of my invention, and all such changes are contemplated as fairly come within the scope of the appended claims.

I claim:

1. The combination of a hinge post, a gate composed of uprights and cross bars pivotally connected to each other, said gate being hingedly mounted on the hinge post, a loop-formed flexible brace member diagonally arranged on the gate, a portion of the loop being on each side of the members of the gate, said loop being adjustably attached at one end to one of the uprights of the gate, and means for deflecting the loop at a point intermediate its ends whereby the distance between the diagonally disposed corners of the gate is varied, said means being located intermediate the upper and lower cross bars, substantially as specified.

2. The combination of a hinge post, a gate composed of uprights and cross bars pivotally connected to each other, said gate being hingedly mounted on the hinge post, a loop formed brace member diagonally arranged on the gate, said loop being adjustably attached at one end to one of the uprights of the gate, and means for adjustably deflecting the loop at a point intermediate its ends thereof, said means being located intermediate the upper and lower cross bars, substantially as specified.

3. The combination of a hinge post, a gate composed of uprights and cross bars pivotally connected to each other, said gate being hingedly mounted on the hinge post, a flexible loop brace member diagonally arranged on the gate, an anchoring member provided with notches mounted at one end of the gate, one end of said loop member being adjustably attached to said anchoring member by means of said notches, and means for deflecting the bracing member at a point intermediate its ends, substantially as specified.

4. The combination of a hinge post, a gate composed of uprights and cross bars pivotally connected to each other, said gate being hingedly mounted on the hinge post, a flexible loop brace member diagonally arranged on the gate, an anchoring member provided with notches mounted at one end of the gate, one end of said loop member being adjustably attached to said anchoring member by means of said notches, means for adjustably deflecting the loop at a point intermediate its ends, whereby the distance between the ends of the loop and the diagonally disposed corners of the gate is varied and the free end of the gate adjustably raised or lowered, said means for adjustably deflecting the intermediate portion of the loop member comprising a stepped or notched member attached to one of the cross bars, and a bail slidably mounted on said loop and adapted to be retained at different notches on the stepped member, substantially as specified.

5. The combination of a hinge post, a gate composed of uprights and cross bars pivotally connected to each other, said gate being hingedly mounted on the hinge post, a flexible loop bracing member extending on opposite sides of said gate and diagonally arranged thereon, said loop being adjustably attached to an anchoring member at one end, said anchoring member comprising a slotted portion having notches therein and a T-shaped end, and slidably mounted between a pair of uprights, and means for adjustably deflecting the loop at a point intermediate its ends, said means comprising a triangular stepped piece mounted on one of the cross bars of the gate, and a bail slidably mounted on the loop and adapted to be adjusted on the steps of the triangular member, substantially as specified.

6. In a gate, an anchoring member, said anchoring member comprising an inclosed slotted portion at one end, said slotted portion being provided with notches and having a T-shaped portion at the other end, substantially as specified.

JAMES CARROLL.

Witnesses:
GEO. I. KENDRICK,
E. J. STRAUS.

Copies of this patent may be obtained for five cents each, by addressing the "Commissioner of Patents, Washington, D. C."